Aug. 7, 1928.
I. B. GILBERT
CHECK VALVE
Filed April 12, 1924
1,679,898
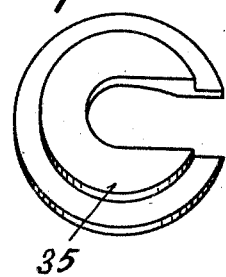
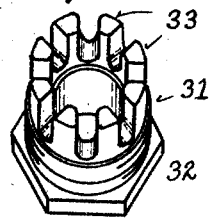
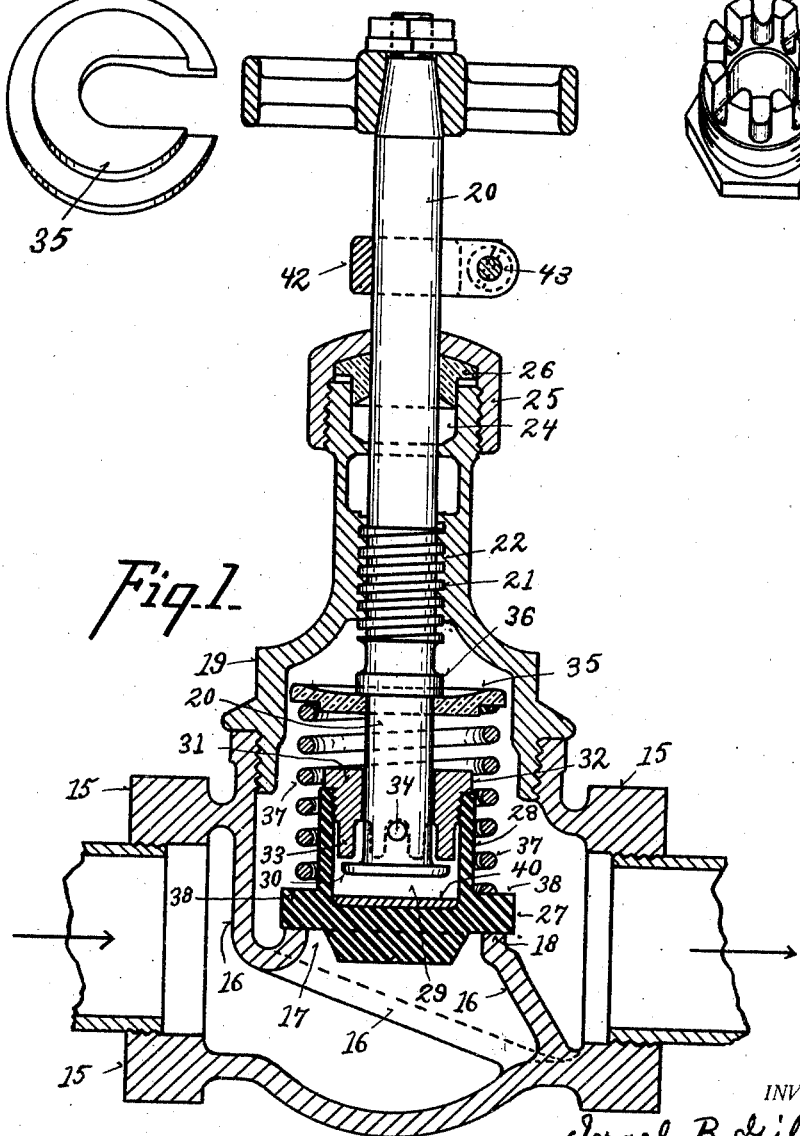
INVENTOR.
Israel B. Gilbert
BY
C. W. Miles,
ATTORNEY.

Patented Aug. 7, 1928.

1,679,898

UNITED STATES PATENT OFFICE.

ISRAEL B. GILBERT, OF CINCINNATI, OHIO.

CHECK VALVE.

Application filed April 12, 1924. Serial No. 706,208.

My invention relates to an improved check valve. One of its objects is to provide an improved check valve apparatus adapted to regrind the valve faces from time to time as may be required without removing the valve or any of its members from their assembled relation. Another object is to provide a check valve apparatus adjustable at will to adjust, limit, or vary the amount of valve movement as may be required. Another object is to provide a check valve in which the tension tending to close the valve upon its seat may be variably adjusted at will. Another object is to provide means exteriorly of the valve casing to indicate substantially the position of the valve stem with reference to the valve, and substantially the tension upon the valve to hold the valve to its seat. My invention also comprises certain details of form, and combination of components, all of which will be fully set forth in the description of the accompanying drawings in which:

Fig. 1 is a central vertical section through a check valve and valve casing embodying my improvements.

Fig. 2, is a perspective view of a detachable collar, detached.

Fig. 3, is a perspective view of a toothed sleeve or valve rotating member, detached.

The accompanying drawings illustrate the preferred embodiment of my invention in which 15 represents a check valve casing adapted to be introduced into a pipe line wherever a check valve may be required, and provided with a partition wall 16 through which is a valve port 17, and at one face of which port is provided an annular valve seat 18.

A valve bonnet 19 is threaded to the valve casing and forms a tight joint therewith. A valve stem 20 is provided with a threaded section 21 which engages corresponding threads 22 in the bore of the bonnet. A packing box 24 and packing nut 25 and gland 26 provide for packing against leakage of fluids from the interior of the valve casing along the valve stem. A check valve 27 is seated upon the valve seat 18 and is provided at its opposite face with an annular flange 28 forming a central recess 29 into which the lower end of the valve stem projects. The lower end of the valve stem is preferably provided with a head 30 of slightly less diameter than the diameter of the recess 29 while the diameter of the valve stem above the head is of materially less diameter than the diameter of the recess 29. A sleeve or gland 31 provided with a wrench seat 32 and a plurality of clutch teeth 33 at its opposite end is threaded into the upper end of the recess 29 above the head 30. A pin 34 passing through the lower end of the stem 20 and projecting from the stem at opposite ends serves to engage in the recesses between the clutch teeth 33 to thereby normally cause the sleeve 31 and valve 27 to rotate with the stem 20. A detachable collar 35 is seated against a flange or collar 36 rigid upon the stem 20 above the sleeve 31. A coiled spring 37 is interposed between the collar 35 and an annular shoulder 38 upon the valve 20 exteriorly of the flange 28. The pin 34 by engaging the sleeve 31 prevents the valve being forced endwise off from the end of the valve stem 20 by the thrust of the spring 37. As the valve stem 20 is fed endwise toward the valve seat the valve seats under mild tension from the spring 37 upon the valve seat to close the valve. The valve is then held to its seat solely by the tension of the spring 37, and hence is free to function as a check valve and to be lifted temporarily from its seat against the tension of the spring 37. At the same time by further rotating the valve stem or by rocking the valve stem backward and forward the pin 34 will cause the valve to rotate upon its seat, or to rock rotatably upon its seat under tension of the spring 37 to regrind the valve faces to detach any foreign matter lodged upon the valve seats and to maintain the valve faces in true and serviceable condition without requiring the valve casing to be opened or any of the valve members removed from the valve casing. Also the valve stem may be given several rotations after the valve 20 has seated itself upon the valve seat 18, thereby without disengaging the pin 34 from the teeth 33 compressing the spring 37 and increasing progressively the tension with which the valve is held to its seat. The head at the lower end of the valve stem is designed to act as a stop to limit the degree of lift of the valve from its seat. I preferably provide a buffer disk 40 of fiber, rubber, sheet lead or similar material to prevent unnecessary hammer or noise due to contact of the valve with the end of the valve stem as the valve lifts from its seat. By adjustment of the valve stem 20 the distance between the lower end of the stem and the disk 40 may be varied at will to predetermine not only the tension holding the check valve to its seat but also to predetermine the amount of lift or movement of the check valve from its seat and thereby the rate of liquid flow through or past the check valve. In order to prevent unauthorized operation of the valve stem to force the end of the valve stem against the disk 40 or the valve so as to prevent any lift of the check valve from its seat, and also to enable the valve stem exteriorly of the valve casing to serve as an indicator of the position of the check valve and the amount of lift possessed by the check valve, I provide a split collar 42 and a clamping screw 43 therefor whereby the collar 42 is clamped rigidly upon the valve stem above the bonnet and serves both to limit the downward movement of the valve stem to prevent positively closing the valve, but also serves to indicate by its position above the bonnet the amount of lift possessed by the check valve.

The clutch teeth are preferably of sufficient length that the valve stem may have a considerable range of movement vertically without disengaging the pin 34 from said teeth 33, thereby providing for rotating the valve upon its seat by rotating or by rocking the valve stem to regrind the valve seats or faces. In the event that it is desired to positively close the valve upon its seat, the collar 42 is released from the valve stem and the stem 20 is fed downwardly compressing the spring 37 until the pin 34 clears and is disengaged from the lower end of the clutch teeth 33 and the lower end of the valve stem contacts with the disk 40 to positively force the valve to its seat. When the valve stem is again fed upwardly the pin 34 again engages, usually with a different pair of clutch teeth 33, to establish rotary driving relation between the valve stem and valve, but with the valve in a new position relative to its seat, which facilitates maintaining true faces upon the valve and the valve seat and effectively regrinding and restoring said faces through rotation of the valve stem.

The apparatus shown and described is capable of considerable modification within the scope of the claims without departing from the spirit of my invention.

What I claim is:

1. A check valve comprising a valve casing having a valve port and a valve seat, a valve stem positively adjustable toward and from said valve seat, a check valve in position to seat upon said valve seat, said valve being mounted upon the inner end of said valve stem to rotate with said valve stem and to move to a limited extent endwise of said valve stem into and out of engagement with said valve seat, said mounting of the valve upon the stem comprising a sleeve extending from the rear face of said valve in which the inner portion of said valve stem moves telescopically to adjustably limit the lift of said check valve from its seat, a collar on said valve stem outside of said sleeve, and a coiled spring encircling said sleeve and interposed between said valve and the collar on said valve stem to resiliently hold said valve to its seat.

2. In a valve, a casing having a seat, a valve stem axially movable with respect to the seat upon rotation within the casing, a valve plug carried by the stem, and means of connection between the plug and stem to permit of a limited relative axial movement therebetween when the plug is in engagement with the seat, said means of connection comprising an interiorly threaded axially recessed portion in the plug at the opposite side from its face, a sleeve threadedly engaged in said recess and having longitudinal diametrically disposed slots, the end of the stem extending through said sleeve and provided with radially projecting shoulders engaging in said slots, a spring seat surrounding the stem and a coiled expansion spring having its opposite ends respectively engaging the spring seat and valve plug for normally projecting the plug from the end of the stem.

In testimony whereof, I have hereunto affixed my signature.

ISRAEL B. GILBERT.